United States Patent [19]

Himes

[11] Patent Number: 5,750,622
[45] Date of Patent: May 12, 1998

[54] HIGH TEMPERATURE LOW VISCOSITY THERMOPLASTIC ELASTOMER BLOCK COPOLYMER COMPOSITIONS

[75] Inventor: Glenn Roy Himes, Houston, Tex.

[73] Assignee: Shell Oil Company, Houston, Tex.

[21] Appl. No.: 821,138

[22] Filed: Mar. 20, 1997

Related U.S. Application Data

[60] Provisional application No. 60/013,949 Mar. 22, 1996.
[51] Int. Cl.$^6$ .................... C09J 153/02; C09J 171/12; C08L 53/02
[52] U.S. Cl. ........................... 525/92 D; 524/271
[58] Field of Search ............... 525/92 D; 524/271

[56] References Cited

U.S. PATENT DOCUMENTS

| | | | |
|---|---|---|---|
| 4,104,323 | 8/1978 | Hansen | 260/829 |
| 4,141,876 | 2/1979 | Hansen | 260/33.6 UA |
| 5,118,748 | 6/1992 | Fujita et al. | |
| 5,229,464 | 7/1993 | Erickson et al. | |
| 5,393,841 | 2/1995 | Himes et al. | 525/314 |

FOREIGN PATENT DOCUMENTS

WO 90/14397  5/1990  WIPO.

OTHER PUBLICATIONS

International Search Report of 2 Jun. 1997.

*Primary Examiner*—David Buttner
*Attorney, Agent, or Firm*—Donald F. Haas

[57] ABSTRACT

The present invention provides high service temperature, low viscosity rubber compounds and hot melt adhesive and/or sealant compositions by combining from 2 to 30% by weight of a polyphenylene ether resin having an I.V. of 0.07 to 0.25 deciliters per gram (dl/g) with from 70 to 98% by weight of an asymmetric radial elastomeric vinyl aromatic hydrocarbon/conjugated diene block copolymer having one of the following formulae: (I) $(A-HD)_x-Y-(UD)_z$ or (II) $(UD-A-HD)_x-Y$ or (III) $(UD-A-HD)_x-Y-(UD)_z$ wherein A is a vinyl aromatic hydrocarbon block having a weight average molecular weight of from 4000 to 16,000, HD is a hydrogenated conjugated diene block having a weight average molecular weight of from 10,000 to 50,000, Y is a multifunctional coupling agent, UD is a partially hydrogenated conjugated diene block having a weight average molecular weight of from 1000 to 45,000, x is an integer from 2 to 30, z is an integer from 1 to 20, and x+z ranges from 3 to 31. These compositions may be used in adhesive and sealant compositions by adding to them from 20 to 400 parts per 100 parts of copolymer of a tackifying resin.

6 Claims, No Drawings

HIGH TEMPERATURE LOW VISCOSITY THERMOPLASTIC ELASTOMER BLOCK COPOLYMER COMPOSITIONS

CROSSREFERENCE TO RELATED APPLICATIONS

This application claims the benefit of U.S. Provisional application Ser. No. 60/013,949, filed Mar. 22, 1996.

FIELD OF THE INVENTION

The present invention relates to high service temperature low viscosity block copolymers which contain polyphenylene ether resins and block copolymers of vinyl aromatic hydrocarbons and conjugated dienes. More particularly, the present invention relates to improved high service temperature block copolymer blends which can be used for rubber compounds and hot melt adhesive and sealant compositions utilizing polyphenylene ether resins and radial elastomeric block copolymers which have both saturated and partially unsaturated diene block arms.

BACKGROUND OF THE INVENTION

Polyphenylene ether, or PPE, has long been known to enhance the service temperature of vinyl aromatic, usually styrenic, block copolymers. (For convenience, unless otherwise noted, PPE and PS will be used as a shortcut designation for polyphenylene ethers and vinyl aromatic hydrocarbons, respectively.) This benefit stems from the thermodynamic compatibility of PPE and polystyrene (PS), the polymer which makes up the hard phase blocks of styrenic block copolymers. Being partially miscible with PS, PPE causes blends of these two polymers to have glass transition temperatures (Tg's) well above that of PS alone and therefore elevates the useful service temperature of block copolymers containing it. Service temperature enhancements of 10 to 60° C. above that of the host styrenic block polymer (e.g., from 100° C. up to 110-160° C.) are of commercial interest. PPE, with a Tg of about 215° C., is well able to provide such enhancements.

Unfortunately, the Tg increase afforded by PPE comes with a penalty in viscosity. Often the potential benefit of PPE cannot be realized in practical compositions because of this factor. The high viscosity creates difficult mixing, high temperature during mixing, and poor dispersion of PPE in the host polymer. A significant proportion of the PPE never diffuses into the domains of PS where its influence on Tg can be effected. Rather, it remains as a dispersed phase in the rubber, acting like a filler and causing a high viscosity in the final blend.

It is known that experimental low molecular weight grades of PPE reduce the viscosity penalty described above. These grades have intrinsic viscosities (I.V.'s) of about 0.07 dl/g to about 0.25 dl/g, compared to 0.29 dl/g to 0.49 dl/g for commercial grades which exhibit difficult processability. The molecular weight ranges corresponding to the I.V.'s of the latter grades are about 12,000 to 23,000 (Mn) and 30,000 to 60,000 (Mw), respectively.

We have found that, in addition to improved processability, low I.V. PPE grades enhance heat resistance more efficiently than commercial grades. This might be expected from the prior art. However, we have discovered a combination of a low I.V. PPE and a certain class of styrenic block copolymers wherein the aforementioned viscosity penalty is extraordinarily small and for all practical purposes, virtually absent. For example, increases in slump temperatures in a sealant formulation of 30 to 35° C. can be obtained with viscosity increases of only 0.3 to 0.4 Pa-sec. The ratio of slump temperature benefit to viscosity increase, i.e., 35° C. divided by 0.32 Pa-sec, is 109. The corresponding calculation for conventional block copolymer combined with commercial PPE is 30° C. divided by 3.11 Pa-sec, or 9.6. Even conventional block copolymer combined with low molecular weight PPE shows only a modest increase in this ratio, i.e., to 10.7. Thus, the invention relates to a particular combination of PPE and block copolymer which exhibits unexpected, useful behavior with essentially no reduction in other desirable properties.

SUMMARY OF THE INVENTION

The present invention provides high service temperature, low viscosity rubber compounds and hot melt adhesive and/or sealant compositions by combining from 2.0 to 30.0% by weight of a polyphenylene ether resin having an I.V. of 0.07 to 0.25 deciliters per gram (dl/g) with from 70.0 to 98.0% by weight of an asymmetric radial elastomeric vinyl aromatic hydrocarbon/conjugated diene block copolymer having one of the following formulae:

$$(A-HD)_x-Y-(UD)_z \quad (I)$$

or

$$(UD-A-HD)_x-Y \quad (II)$$

or

$$(UD-A-HD)_x-Y-(UD)_z \quad (III)$$

wherein A is a vinyl aromatic hydrocarbon block having a weight average molecular weight of from 4000 to 16,000, HD is a hydrogenated conjugated diene block having a weight average molecular weight of from 10,000 to 50,000, Y is a multifunctional coupling agent, UD is a partially hydrogenated conjugated diene block having a weight average molecular weight of from 1000 to 45,000, x is an integer from 2 to 30, z is an integer from 1 to 20, and x+z ranges from 3 to 31. These compositions may be used in adhesive and sealant compositions by adding to them from 20 to 400 parts per 100 parts of copolymer of a tackifying resin. The adhesive and sealant compositions may also contain resins which extend the diene phase, resins which reinforce and/or extend the vinyl aromatic phase, polyolefins, fillers, wax, stabilizers and reactive components designed to crosslink the polymers and/or resins.

DETAILED DESCRIPTION OF THE INVENTION

The first of the primary novel components of the compositions of the present invention is the above-described block copolymer which has both saturated and unsaturated arms. The styrene-hydrogenated diene arms provide the primary load bearing capability for the intended uses, i.e., adhesive and sealant compositions. It is important that these arms be hydrogenated so that the structural integrity of the polymer is preserved even if outside forces cause degradation of the unsaturated side chains. The unsaturated diene homopolymer arms are important in the composition to give the composition sufficient tack properties and/or the ability to be tackified to make effective compositions, such as pressure sensitive adhesive compositions.

The molecular weights of linear polymers or unassembled linear segments of polymers such as mono-, di-, triblock, etc., or the arms of star polymers before coupling are conveniently measured by Gel Permeation Chromatography (GPC), where the GPC system has been appropriately calibrated. For anionically polymerized linear polymers, the polymer is essentially monodisperse (weight average molecular weight/number average molecular weight ratio approaches unity), and it is both convenient and adequately descriptive to report the "peak" molecular weight of the narrow molecular weight distribution observed. Usually, the peak value is between the number and the weight average. The peak molecular weight is the molecular weight of the main species shown on the chromatograph. For polydisperse polymers the weight average molecular weight should be calculated from the chromatograph and used. The materials used in the columns of the GPC are styrene-divinyl benzene gels or silica gels. The solvent is tetrahydrofuran and the detector is a refractive index detector.

The polymers include a vinyl aromatic hydrocarbon block having a weight average molecular weight of from 4000 to 16,000, a hydrogenated conjugated diene block having a weight average molecular weight of from 10,000 to 50,000, and a partially hydrogenated conjugated diene block having a weight average molecular weight of from 1000 to 45,000. A preferred polymer for use in this invention has an overall weight average molecular weight of 115,000 or less and a vinyl aromatic hydrocarbon block weight average molecular weight of 4000 to 10,000.

The polymers of this invention may be hydrogenated as disclosed in U.S. Pat. No. Reissue 27,145 which is herein incorporated by reference. The hydrogenation of these polymers and copolymers may be carried out by a variety of well established processes including hydrogenation in the presence of such catalysts as Raney Nickel, noble metals such as platinum and the like, soluble transition metal catalysts and titanium catalysts as in U.S. Pat. No. 5,039,755 which is also incorporated herein by reference. The polymers may have different diene blocks and these diene blocks may be selectively hydrogenated as described in U.S. Pat. No. 5,229,464 which is also incorporated herein by reference.

The A blocks are polymer blocks of a vinyl aromatic hydrocarbon. Preferably, the vinyl aromatic hydrocarbon is styrene. Other useful vinyl aromatic hydrocarbons include alphamethyl styrene, various alkyl-substituted styrenes, alkoxy-substituted styrenes, vinyl naphthalene, vinyl toluene and the like. The HD and UD blocks are polymer blocks of conjugated dienes. The preferred diene for the HD blocks is butadiene. Isoprene is preferred for the UD blocks. Other dienes may also be used, including piperylene, methylpentadiene, phenylbutadiene, 3,4-dimethyl-1,3-hexadiene, 4,5-diethyl-1,3-octadiene and the like, preferably those conjugated dienes containing 4 to 8 carbon atoms. It is preferred that the conjugated diene employed in the HD block differ from that employed in the UD block, especially in respect to ease of hydrogenation.

The diene in the HD block should preferably hydrogenate faster and more completely than the diene in the UD block. The amount of hydrogenation in the unsaturated (UD) blocks after the reaction may be such that the UD blocks are up to 90 percent saturated, i.e. contain at least 10% residual unsaturation. Preferably, at least 50 percent, most preferably from 50 up to 90 percent of the original unsaturation of the diene in the UD blocks remain after partial hydrogenation. Generally, the melt viscosity of these polymers is lowered when the residual unsaturation is increased. For hot melt adhesives, it is better to have a lower melt viscosity at a given temperature so that the formulation is more easily processable.

The A—HD arms or blocks may be hydrogenated as generally described in the prior art, preferably so as to reduce at least about 90 percent of any olefinic double bonds in the polymer chains. Suitably at least 50 percent, preferably at least 70 percent, and more preferably at least 90 percent, most preferably at least 95 percent of the original olefinic unsaturation in the A—HD arms is hydrogenated.

The dienes used in this invention preferably should be those which are largely amorphous at use temperatures (usually 10° C. to 40° C.) and do not contain excess crystallinity which would interfere with flexibility. For butadiene, e.g., the percent of 1,2 addition should preferably be 30 percent to 65 percent to prevent excessive crystallinity after hydrogenation to ethylene-butylene (EB) rubber. Below 30 percent 1,2 addition, polymer crystallinity is too high, giving a stiff polymer which is unsuitable for pressure sensitive adhesives. Above 65 percent the Tg (glass transition temperature) of the polymer is too high, making it difficult to formulate an acceptable pressure sensitive adhesive. For sealants, the 1,2 addition should be at least 30% or it will be too stiff.

The preferred method for making the block copolymers of the present invention is basically described in European Patent Application 0,314,256. Therein is disclosed a two-step process for producing asymmetric radial polymers which avoids the problem of the production of the unwanted homopolydiene polymer. The process involves separately polymerizing the monomers to create separately the two different types of arms. Then one set of the polymeric arms is coupled to the coupling agent and when that coupling reaction is complete, the second set of polymer arms is coupled to the coupling agent. This ensures that there will be very little homopolydiene in the final polymer. In the present invention, for example, isoprene arms would be anionically polymerized, and coupled via the coupling agent. Subsequently or in parallel, styrene-butadiene (SB) arms would be anionically polymerized and at least 2 arms then coupled to the isoprene arms via the coupling agent. These unhydrogenated precursors are useful as adhesives and sealants on their own but they suffer the stability problems common to polymers with a high degree of unsaturation (for example, $(SB)_2$—Y—$I_2$). Subsequently, the coupled polymer is hydrogenated under conditions that preferably hydrogenate the diene of the A—HD arm (or block) only, leaving the diene of the UD arm (or block) essentially unsaturated.

In general, the method described is used to prepare asymmetric radial or star polymers with any polymer containing a reactive end group which will react with one or more functional groups contained in the selected coupling agent. The method is particularly suitable for the preparation of asymmetric radial polymers from so-called "living" polymers containing a single terminal metal ion. As is well known in the prior art, "living" polymers are polymers containing at least one active group such as a metal atom bonded directly to a carbon atom. "Living" polymers are readily prepared via anionic polymerization. Since the present invention is particularly well suited to the preparation of asymmetric radial polymers using "living" polymers to form the arms thereof, the invention will be described by reference to such polymers. It will, however, be appreciated that the invention would be equally useful with polymers having different reactive groups so long as the selected coupling agent contains functional groups which are reactive with the reactive site contained in the polymer.

Living polymers containing a single terminal group are, of course, well known in the prior art. Methods for preparing such polymers are taught, for example, in U.S. Pat. Nos.

3,150,209; 3,496,154; 3,498,960; 4,145,298 and 4,238,202. Methods for preparing block copolymers such as those preferred for use in the method of the present invention are also taught, for example, in U.S. Pat. Nos. 3,231,635; 3,265,765 and 3,322,856. These patents are herein incorporated by reference. When the polymer product is a random or tapered copolymer, the monomers are, generally, added at the same time, although the faster reacting monomer may be added slowly in some cases, while, when the product is a block copolymer, the monomer used to form the separate blocks are added sequentially.

In general, the polymers useful as arms in the asymmetric radial polymers of this invention may be prepared by contacting the monomer or monomers with an organoalkali metal compound in a suitable solvent at a temperature within the range from $-150°$ C. to $300°$ C., preferably at a temperature within the range from $0°$ C. to $100°$ C. Particularly effective polymerization initiators are organolithium compounds having the general formula:

RLi wherein R is an aliphatic, cycloaliphatic, alkyl-substituted cycloaliphatic, aromatic or alkyl-substituted aromatic hydrocarbon radical having from 1 to 20 carbon atoms.

In general, the living polymers used as arms in the asymmetric radial polymer will be contacted with the coupling agent at a temperature within the range from $0°$ C. to $100°$ C. at a pressure within the range from 0 bar to 7 bar and the contacting will be maintained until reaction between the arms and the coupling agent is complete or at least substantially completed, generally for a period of time within the range from 1 to 180 minutes.

In general, the polymers useful as arms in the asymmetric radial polymers of this invention will be in solution when contacted with the coupling agent. Suitable solvents include those useful in the solution polymerization of the polymer and include aliphatic, cycloaliphatic, alkyl-substituted cycloaliphatic, aromatic and alkyl-substituted aromatic hydrocarbons, ethers and mixtures thereof. Suitable solvents, then, include aliphatic hydrocarbons such as butane, pentane, hexane, heptane and the like, cycloaliphatic hydrocarbons such as cyclohexane, cycloheptane and the like, alkyl-substituted cycloaliphatic hydrocarbons such as methylcyclohexane, methylcycloheptane and the like, aromatic hydrocarbons such as benzene and the alkyl-substituted aromatic hydrocarbons such as toluene, xylene and the like and ethers such as tetrahydrofuran, diethylether, di-n-butyl ether and the like. Since the polymers useful in making the asymmetric radial polymers of this invention will contain a single terminal reactive group, the polymers used in preparation of the asymmetric radial polymers will be retained in solution after preparation without deactivating the reactive (living) site. In general, the coupling agents may be added to a solution of the polymer or a solution of the polymer may be added to the coupling agent.

Any of the coupling agents known in the prior art to be useful in forming a radial polymer by contacting the same with a living polymer may be used in both the method of this invention and the asymmetric radial polymers of this invention. Suitable coupling agents will contain three or more functional groups which will react with the living polymer at the metal-carbon bond. While the method of the present invention will improve the relative distribution of different arms in an asymmetric radial polymer having any number of arms, the method is very effective when the coupling agent contains from three to about twenty or forty functional groups reactive with the metal-carbon bond of the "living" polymer. Suitable coupling agents, then include $SiX_4$, $RSiX_3$, $HSiX_3$, $X_3Si—SiX_3$, $RX_2Si—(CH_2)x—SiX_2R$, $RX_2Si(CH_2)x—SiX_2—(CH_2)x—SiX_2R$, $X_3Si—(CH_2)x—SiX_3$, $RC(SiX_3)_3$, $R(CH_2SiX_3)_3$, $C(CH_2SiX_3)_4$ and the like, particularly those containing from three to about six functional groups. In the foregoing formulae: each X may, independently, be fluorine, chlorine, bromine, iodine, alkoxide radicals, carboxylate radicals, hydride and the like; R is a hydrocarbyl radical having from 1 to about 10 carbon atoms, preferably from 1 to about 6 carbon atoms; and x is a whole number from 1 to about 6. Particularly useful coupling agents include tetraalkoxysilanes, such as tetramethoxysilane, and the silicon tetrahalides such as silicon tetrafluoride, silicon tetrachloride, silicon tetrabromide and the like, and bis(trihalo)silanes such as bis(trihalo)silylethane and hexahalodisilane where the halogen may be fluorine, chlorine, bromine, or iodine. Divinylbenzene and oligomers of such are also useful coupling agents.

The coupling process per se is described in detail in U.S. Pat. No. 4,096,203 which is herein incorporated by reference. Specific multifunctional coupling agents useful herein are described in that patent but there are other coupling agents which may also be useful herein.

The other primary component of the compositions of the present invention is a low molecular weight polyphenylene ether resin (PPE), also known as polyphenylene oxide, having an intrinsic viscosity of 0.07 to 0.25 deciliters per gram (dl/g), when measured in solution in chloroform at $25°$ C. The molecular weight may also be described as 1000 to 15,000 viscosity average molecular weight, 1000 to 10,000 number average molecular weight, 2000 to 22,000 weight average molecular weight. Obviously, these resins have a wider molecular weight distribution than the block copolymers.

The polyphenylene ether resin is preferably one which is comprised of the formula:

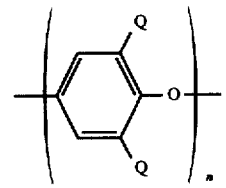

wherein the oxygen ether atom of one of the units is connected to the benzene nucleus of the next adjoining unit, n is a positive integer and each Q is a monovalent substituent selected from the group consisting of hydrogen, halogen, hydrocarbon radicals free of a tertiary alpha carbon atom, halohydrocarbon radicals having at least two carbon atoms between the halogen atom and the phenyl nucleus, hydrocarbonoxy radicals and halohydrocarbonoxy radicals having at least two carbon atoms between the halogen atom and the phenyl nucleus.

For purposes of the present invention, an especially preferred family of polyphenylene ethers includes those having alkyl substitution in the two positions ortho to the oxygen ether atom, i.e., those of the formula wherein each Q is alkyl, most preferably having from one to four carbon atoms. The most preferred polyphenylene ether resin for the purposes of this invention is poly(2,6-dimethyl-1,4-phenylene) ether.

In general, the polyphenylene ether resins of this invention can be prepared by the following procedures fully described in U.S. Pat. Nos. 3,306,874 and 3,257,375, which are herein incorporated by reference. The polyphenylene ethers are self-condensation products of monohydric monocyclic phenols typically produced by reacting the phenols in the presence of a complexing agent or complex metal, e.g., copper catalyst. In general, the molecular weight will be controlled by the reaction time with longer times providing a higher average number of repeating structural units. For low molecular weight PPE, at some point before an intrinsic viscosity of 0.25 deciliters per gram, is obtained, the reaction is terminated. Termination can be brought about by the use of conventional means. For instance, in the case of reaction systems which make use of complex metal catalysts, the polymerization reaction can be terminated by adding an acid, e.g., hydrochloric or sulfuric acid, or the like, or a base, e.g., lime, sodium hydroxide, potassium hydroxide, and the like, or the product is separated from the catalyst by filtration, precipitation or other suitable means.

It may be necessary to add a different kind of adhesion promoting or tackifying resin that is compatible with a polymer. A common tackifying resin is a diene- olefin copolymer of piperylene and 2-methyl-2-butene having a softening point of about 95° C. This resin is available commercially under the tradename WINGTACK® 95 and is prepared by the cationic polymerization of 60 percent piperylene, 10 percent isoprene, 5 percent cyclopentadiene, 15 percent 2-methyl-2-butene and about 10 percent dimer, as taught in U.S. Pat. No. 3,577,398. Other resins which are also useful in compositions of the present invention include those which are hydrogenated, such as hydrogenated rosins, esters of rosins, polyterpenes, terpene phenol resins and polymerized mixed olefins, lower softening point resins and liquid resins. An example of a liquid resin is Regalrez® 1018 resin (a hydrogenated pure monomer resin) from Hercules. The amount of adhesion promoting resin employed varies from 0 to 400 parts by weight per 100 parts of polymer (pbw). The selection of the particular tackifying resin is, in large part, dependent upon the specific polymer employed in the respective adhesive or sealant composition.

An endblock resin may be included to reinforce the styrene portion of the block copolymer. The endblock compatible resin is a resin which is compatible with the polymer block which is normally on the end of the block copolymers of the present invention, i.e., the vinyl aromatic hydrocarbon block. Such endblock compatible resins are often used as reinforcing agents. Normally, these resins should have a ring and ball softening point between 80° C. and 150° C. although mixtures of aromatic resins having high and low softening points may also be used. Useful resins include coumarone-indene resins, poly alpha methyl styrene, polystyrene resins, vinyl toluene-alpha-methyl styrene copolymers and polyindene resins.

Examples of aromatic resins useful in the formulations of the present invention are AMOCO® 18 series resins, which are composed of poly alpha methyl styrene (AMOCO), Kristalex® series resins, which are composed largely of poly alpha methyl styrene (HERCULES), PICCOTEX® Series resins, which are composed of alpha methyl styrene and vinyl toluene (HERCULES), NEVCHEM® (NEVILLE) and PICCO 6000 (HERCULES) series resins, which are composed of aromatic hydrocarbons, CUMAR® series resins and CUMAR LX-509 (NEVILLE), which are composed of coumarone-indene, PICCOVAR® AP series resins (HERCULES), which are composed of alkyl aryl species, PICCOVAR® 130 (HERCULES), which is an alkyl aromatic poly indene resin, and ENDEX® 155 (HERCULES), a resin derived by copolymerization of pure aromatic monomers.

The compositions of the present invention may contain plasticizers or compounding oils or organic or inorganic pigments and dyes. Optional components are stabilizers which inhibit or retard heat degradation, oxidation, skin formation and color formation. Various types of fillers and pigments can be included in the rubber compound or adhesive/sealant formulation. A wide variety of fillers can be used including calcium carbonate, clays, talcs, silica, zinc oxide, titanium dioxide and the like. Polyolefin resins such as polypropylene, ethylene/propylene copolymers, or copolymers of ethylene/octene or ethylene/hexene can also be used. The key advantage of the present invention is providing a formulation for an adhesive, sealant, etc. which has a higher service temperature than formulations utilizing the standard block copolymers and high or low viscosity PPE, but does not sacrifice other properties, especially processability. The addition of the PPE increases the service temperature as well as the viscosity when Conventional Polymers are used, but when the asymmetric radial polymers of this invention are used, PPE increases the service temperature with little or only a moderate increase in viscosity. The use of these formulations helps to improve the high temperature deformation properties of the thermoplastic elastomers and makes them more useful in automotive, wire and cable, and other applications involving high temperatures while also aiding the fabrication processes necessary for these applications. Such applications include sealants, certain types of pressure sensitive tape, contact and structural adhesives, asphalt modification for roofing and paving, thermoplastic modification and fibers.

EXAMPLE 1

In the experiments described below, Conventional Polymer 1 is a hydrogenated styrene-butadiene-styrene block copolymer with a weight average molecular weight of 83,500. Conventional Polymer 2 is a hydrogenated styrene-butadiene-styrene block copolymer with a weight average molecular weight of 53,000, and Conventional Polymer 3 is an unsaturated styrene-isoprene-styrene block copolymer with a weight average molecular weight of about 150,000. Invention Polymer A is a 4 armed asymmetric radial block copolymer having a weight average molecular weight of 94,000, 2 styrene-hydrogenated butadiene (S—EB) arms having a weight average molecular weight of 34,000, and 2 polyisoprene (I) arms having a weight average molecular weight of about 18,000, wherein 32% of the polyisoprene is hydrogenated. The coupling efficiency is not quite 100%.

The endblock reinforcing resin concentration in the formulations of Tables IA and IIA is 13 pbw (parts by weight per hundred parts of the block copolymer) or 3.36% by weight of the whole formulation. The polystyrene concentration of Invention Polymer A (Table IA) is 18% by weight of the block copolymer and of Conventional Polymer 1 (Table IIA), 13%. In Table IIIA, the endblock reinforcing resin concentration is 30 pbw or 7.43% by weight of the whole formulation. The polystyrene concentration in Conventional Polymer 2 in this formulation is 30% by weight. In Table IVA, the endblock reinforcing resin concentration is 22 pbw (7.19 % by weight of the whole formulation) and the polystyrene concentration in Conventional Polymer 3 in this formulation is 22% by weight.

Several sealant formulations were made with the polymers described above and three PPE's having I.V. of 0.4, 0.15, and 0.115. Temperature dependent properties, such as shear adhesion failure temperature (SAFT) and slump temperature, and melt viscosity were measured. A Brookfield Viscometer model RVTD and spindle 29 was used to measure the viscosity at 177° C. To measure the slump temperature, the sealant formulations were poured hot and allowed to solidify in metal channels with the following dimensions: 2.5 cm wide, by 2.5 cm high, and 1.25 cm deep. The channels were placed vertically in an oven and the temperature was raised in 5° C. increments, allowing the sample to equilibrate for 30 minutes at each temperature before increasing the temperature again. The slump temperature was the temperature at which the sample sagged more than 3/16 inch in the channel. SAFT was determined on a lap-shear bond of 2.5 cm×2.5 cm area on an aluminum surface under a load of 160 g. The temperature was ramped up from 40° C. in 5° C. increments every 10 minutes until bond failure occurred.

Table IA

Sealant Formulation for Invention

| | Formulation Number | | | |
|---|---|---|---|---|
| | R-270 (Control) | R-266 | R-268 | R-267 |
| | | PBW[1] | | |
| Styrene-ethylene/butylene-isoprene block copolymer | 100.0 | 100.0 | 100.0 | 100.0 |
| PS block reinforcing resin (Endex 155) | 13.0 | — | — | — |
| PPE, I.V. 0.40 | — | 13.0 | — | — |
| PPE, I.V. 0.15 | — | — | 13.0 | — |
| PPE, I.V. 0.115 | — | — | — | 13.0 |
| Liquid tackifying resin (Regairez 1018) | 270.0 | 270.0 | 270.0 | 270.0 |
| Antioxidant: Irganox 1010 | 1.0 | 1.0 | 1.0 | 1.0 |
| UV Stabilizer: Tinuvin 770 | 1.0 | 1.0 | 1.0 | 1.0 |
| UV Stabilizer: Tinuvin P | 1.5 | 1.5 | 1.5 | 1.5 |
| Total PBW | 386.5 | 386.5 | 386.5 | 386.5 |

[1]PBW is parts by weight

TABLE IB

Sealant Properties for Invention

| | R-270 | R-266 | R-268 | R-267 |
|---|---|---|---|---|
| Concentration of PPE, weight percent | 3.36 | 3.36 | 3.36 | 3.36 |
| Slump, °C. | 50 | 55 | 85 | 80 |
| SAFT, °C. | 47 | 51 | 68 | 69 |
| Melt Visc. at 177° C., Pa-sec | 0.960 | 1.260 | 1.280 | 1.320 |
| Absolute change in melt visc. vs. R-270 control, Pa-sec | — | 0.300 | 0.320 | 0.360 |
| Fractional increase in visc. over R-270 control | — | 0.313 | 0.333 | 0.375 |
| Change in slump vs. R-270 control formulation, °C. | — | +5 | +35 | +30 |
| Change in slump per absolute change in visc., °C./Pa-sec | — | 17 | 109 | 83 |
| Change in slump per fractional increase in visc., °C. | — | 16 | 105 | 80 |
| Change in slump per weight percent PPE, °C. | — | 1.49 | 10.4 | 8.93 |
| Change in SAFT vs. R-270 control formulation, °C. | — | +4 | +21 | +22 |
| Change in SAFT per absolute change in visc., °C./Pa-sec | — | 13 | 66 | 61 |
| Change in SAFT per fractional increase in visc., °C. | — | 13 | 64 | 59 |
| Change in SAFT per weight percent PPE, °C. | — | 1.2 | 6.31 | 6.64 |

TABLE IIA

Sealant Formulation for Conventional Block Polymer 1

| | Formulation Number | | | |
|---|---|---|---|---|
| | R-269 Control | R-263 | R-265 | R-264 |
| | | PBW | | |
| Styrene-ethylene/butylene block copolymer | 100.0 | 100.0 | 100.0 | 100.0 |
| PS block reinforcing resin (Endex 155) | 13.0 | — | — | — |
| PPE, I.V. 0.40 | — | 13.0 | — | — |
| PPE, I.V. 0.15 | — | — | 13.0 | — |
| PPE, I.V. 0.112 | — | — | — | 13.0 |
| Liquid tackifying resin (Regalrez 1018) | 270.0 | 270.0 | 270.0 | 270.0 |
| Antioxidant: Irganox 1010 | 1.0 | 1.0 | 1.0 | 1.0 |
| UV Stabilizer: Tinuvin 770 | 1.0 | 1.0 | 1.0 | 1.0 |
| UV Stabilizer: Tinuvin P | 1.5 | 1.5 | 1.5 | 1.5 |
| Total PBW | 386.5 | 386.5 | 386.5 | 386.5 |

TABLE IIB

Sealant Properties for Conventional Block Polymer 1

| | R-269 | R-263 | R-265 | R-264 |
|---|---|---|---|---|
| Concentration of PPE, weight percent | 3.36 | 3.36 | 3.36 | 3.36 |
| Slump, °C. | 40 | 45 | 55 | 60 |
| SAFT, °C. | 36 | 37 | 48 | 50 |
| Melt Visc. at 177° C., Pa-sec | 1.07 | 7.81 | 7.42 | 7.05 |
| Absolute change in melt visc. vs. R-269 control, Pa-sec | — | 6.74 | 6.36 | 5.98 |
| Fractional increase in visc. over R-269 control | — | 6.33 | 5.97 | 5.62 |
| Change in slump vs. R-269 control formulation, °C. | — | +5 | +15 | +20 |
| Change in slump per absolute change in visc. °C./Pa-sec | — | 0.74 | 2.36 | 3.34 |
| Change in slump per fractional increase in visc., °C. | — | 0.80 | 2.5 | 3.6 |
| Change in slump per weight percent PPE, °C. | — | 1.49 | 4.46 | 5.95 |
| Change in SAFT vs. R-269 control formulation, °C. | — | +1 | +12 | +14 |
| Change in SAFT per absolute change in visc., °C./Pa-sec | — | 0.15 | 1.89 | 2.34 |
| Change in SAFT per fractional increase in visc., °C. | — | 0.16 | 2.0 | 2.2 |
| Change in SAFT per weight percent PPE, °C. | — | 0.30 | 3.6 | 4.2 |

TABLE IIIA

Sealant Formulation for Conventional Block Polymer 2

| | Formulation Number | | | |
|---|---|---|---|---|
| | R-185 Control | R-186 | R-189 | R-188 |
| | | PBW | | |
| Styrene-ethylene/butylene block copolymer | 100.0 | 100.0 | 100.0 | 100.0 |
| PS block reinforcing resin (Endex 160) | 30.0 | — | — | — |
| PPE, I.V. 0.40 | — | 30.0 | — | — |
| PPE, I.V. 0.15 | — | — | 30.0 | — |
| PPE, I.V. 0.115 | — | — | — | 30.0 |
| Liquid tackifying resin (Regalrez 1018) | 270.0 | 270.0 | 270.0 | 270.0 |

TABLE IIIA-continued

Sealant Formulation for Conventional Block Polymer 2

| | Formulation Number | | | |
|---|---|---|---|---|
| | R-185 Control | R-186 | R-189 | R-188 |
| | | PBW | | |
| Antioxidant: Irganox 1010 | 1.0 | 1.0 | 1.0 | 1.0 |
| UV Stabilizer: Tinuvin 770 | 1.0 | 1.0 | 1.0 | 1.0 |
| UV Stabilizer: Tinuvin P | 1.5 | 1.5 | 1.5 | 1.5 |
| Total PBW | 403.5 | 403.5 | 403.5 | 403.5 |

TABLE IIIB

Sealant Properties for Conventional Polymer 2

| | R-185 | R-186 | R-189 | R-188 |
|---|---|---|---|---|
| Concentration of PPE, weight percent | 7.43 | 7.43 | 7.43 | 7.43 |
| Slump, °C. | 60.0 | 90.0 | 105.0 | 100.0 |
| SAFT, °C. | 52.2 | 59.5 | 81.5 | 80.0 |
| Melt Visc. at 177° C., Pa-sec | 2.04 | 5.15 | 6.20 | 4.63 |
| Absolute change in melt visc. vs. R-185 control, Pa-sec | — | 3.11 | 4.20 | 2.59 |
| Fractional increase in visc. over R-185 control | — | 1.52 | 2.06 | 1.27 |
| Change in slump vs. R-185 control formulation, °C. | — | 30.0 | 45.0 | 40.0 |
| Change in slump per absolute change in visc. °C./Pa-sec | — | 9.6 | 10.7 | 15.4 |
| Change in slump per fractional increase in visc., °C. | — | 20 | 22 | 32 |
| Change in slump per weight percent PPE, °C. | — | 4.04 | 6.06 | 5.38 |
| Change in SAFT vs. R-185 control formulation,°C. | — | 7.3 | 29.3 | 27.8 |
| Change in SAFT per absolute change in visc., °C./Pa-sec | — | 2.3 | 7.0 | 10.7 |
| Change in SAFT per fractional increase in visc., °C. | — | 4.8 | 14 | 22 |
| Change in SAFT per weight percent PPE, °C. | — | 0.98 | 3.94 | 3.74 |

TABLE IVA

Sealant Formulation for Conventional Block Polymer 3

| | Formulation Number | | |
|---|---|---|---|
| | R-220 Control | R-222 | R-221 |
| | | PBW | |
| Styrene-isoprene-styrene block copolymer | 100.0 | 100.0 | 100.0 |
| Processing oil (Shell flex 371) | 30.0 | 30.0 | 30.0 |
| PS block reinforcing resin (Endex 155) | 22.0 | — | — |
| PPE, I.V. 0.15 | — | 22.0 | — |
| PPE, I.V. 0.115 | — | — | 22.0 |
| Tackifying resin (Zonatac 105 Lite) | 150.0 | 150.0 | 150.0 |
| Antioxidant: Irganox 1010 | 1.0 | 1.0 | 1.0 |
| Antioxidant: Polygard HR | 0.5 | 0.5 | 0.5 |
| UV Stabilizer: Tinuvin 770 | 1.0 | 1.0 | 1.0 |
| UV Stabilizer: Tinuvin P | 1.5 | 1.5 | 1.5 |
| Total PBW | 306.0 | 306.0 | 306.0 |

TABLE IVB

Sealant Properties for Conventional Polymer 3

| | R-220 | R-222 | R-221 |
|---|---|---|---|
| Concentration of PPE, weight percent | — | 7.19 | 7.19 |
| Slump, °C. | 85 | 122.5 | 115 |
| SAFT, °C. | 73.2 | 83.9 | 93.0 |
| Melt Visc. at 177° C., Pa-sec | 23.2 | 174.0 | 44.5 |
| Absolute change in melt visc. vs. R-220 control, Pa-sec | — | 150.8 | 21.3 |
| Fractional increase in visc. over R-220 control | — | 6.50 | 0.92 |
| Change in slump vs. R-220 control formulation, °C. | — | 37.5 | 30.0 |
| Change in slump per absolute change in visc. °C./Pa-sec | — | 0.25 | 1.4 |
| Change in slump per fractional increase in visc., °C. | — | 5.8 | 32.6 |
| Change in slump per weight percent PPE, °C. | — | 5.2 | 4.2 |
| Change in SAFT vs. R-220 control formulation, °C. | — | 10.7 | 19.8 |
| Change in SAFT per absolute change in visc., °C./Pa-sec | — | 0.071 | 0.93 |
| Change in SAFT per fractional increase in visc., °C. | — | 1.64 | 21.5 |
| Change in SAFT per weight percent PPE, °C. | — | 1.49 | 2.75 |

When one compares the property data for the sealant made with the composition of the present invention shown in Table IB with the properties of the sealants made with the three Conventional Polymers (Tables IIB, IIIB, and IVB), it is clear that the invention composition is unique in a way that is not shown by the conventional polymer compositions. For example, the viscosity increase caused by the incorporation of PPE in Invention Polymer A was much less than that generated by PPE in the conventional polymers. This means that PPE-containing Invention Polymer A processes more easily (e.g., mixes and extrudes with less energy and time) than PPE-containing conventional polymers. In this comparison the viscosity increase is defined as the increase over the control compounds (R-270, R-269, R-185, and R-220 for Tables IA to IVA, respectively). The control compounds contain conventional endblock reinforcing resin derived from styrenic monomers.

The service temperature improvements afforded by Invention Polymer A are outstanding whether considered as a function of viscosity increase (either absolute or as a fractional increase over the original) or of concentration. For example, the change in slump for formulation R-268 (sealant containing Invention Polymer and 0.15 I.V. PPE) divided by the absolute increase in viscosity gives a figure of 109° C./Pa-sec, compared to only 2.36° C./Pa-sec for the same PPE in Conventional Polymer 1 (formulation R-265 in Table IIA). Similar figures were obtained when the change in slump was divided by the fractional increase in viscosity (105° C./Pa-sec vs. 2.5° C./Pa-sec).

Taking the SAFT figures as examples in a parallel manner, the Invention Polymer yielded 66° and 64° C./Pa-sec whereas Conventional Polymer 1 yielded figures of 1.89 and 2.0, respectively. The changes in service temperature per unit concentration of PPE in a sealant formulation were also impressive for Invention Polymer A, though not of the magnitude of the comparisons cited above. Slump increases per unit concentration of PPE in Invention Polymer A formulations were about twice those in conventional polymer formulations, especially for low I.V. PPE's (9° to 10° C.

vs. 3° to 6° C. for Conventional Polymers 1–3). SAFT increases per unit concentration of PPE in Invention Polymer A formulations were 1.6 to 4.2 times higher than those in conventional polymer formulations.

Thus, the foregoing example demonstrates that the invention composition produces higher service temperatures by a variety of modes of comparison than conventional styrenic block copolymers, ranging from saturated types of different molecular weights and polystyrene contents to typical unsaturated block copolymers in a different formulation.

EXAMPLE 2

In these experiments, three different polymers within the scope of this invention were tested as described above. The polymers are all very similar to Invention Polymer A with the differences noted in Table V below. Invention Polymer C was a blend of Invention Polymer $C_1$ and $C_2$ as described.

TABLE V

Invention Polymers B-D

| | B | C (58 wt %) | C (42 wt %) | D |
|---|---|---|---|---|
| | | Polymer | | |
| | | $C_1$ | $C_2$ | |
| Total MW | 92,900 | 123,200 | 126,000 | 120,100 |
| Styrene Block MW | 9100 | 11,800 | 11,400 | 11,200 |
| S-EB Arm MW | 32,000 | 45,600 | 42,100 | 42,600 |
| Polyisoprene Arm MW | 17,000 | 20,400 | 24,800 | 23,100 |
| No. S-EB Arms[1] | 2 | 2 | 2 | 2 |
| No. Polyisoprene Arms[2] | 2 | 2 | 2 | 2 |

[1] predominately 2 arms; some molecules contain 3 S-EB arms and others only 1
[2] predominately 2 arms; some molecules contain 3 polyisoprene arms and others only 1

Formulations of these polymers were made as described above both with and without PPE. The PPE was contained in Arizona XR-6503 resin which contains 50 wt % of PPE (intrinsic viscosity—0.12 dl/g) and 50 wt % of a styrenated terpene tackifying resin. The other ingredients are described above. Table VI gives the sealant formulations for Invention Polymers B and C and also shows their sealant properties. Table VII gives the same information for Invention Polymer D.

TABLE VI

Sealant Formulations and Properties for Invention Polymers B and C

| | Formulation Number | | | |
|---|---|---|---|---|
| | R-460 Control | R-462 | R-505(1) Control PBW | R-506(1) |
| Invention Polymer B | 100.0 | 100.0 | — | — |
| Invention Polymer C | — | — | 100.0 | 100.0 |
| Endex 155 | 13 | — | 13 | — |
| Arizona XR-6503 | — | 26 | — | 26 |
| Regalrez 1018 | 270 | 257 | 270 | 257 |
| Antioxidant: Irganox 1010 | 1.0 | 1.0 | 1.0 | 1.0 |
| UV Stabilizer: Tinuvin 770 | 1.0 | 1.0 | 1.0 | 1.0 |
| UV Stabilizer: Tinuvin P | 1.5 | 1.5 | 1.5 | 1.5 |
| Total PBW | 386.5 | 386.5 | 386.5 | 386.5 |

TABLE VI-continued

Sealant Formulations and Properties for Invention Polymers B and C

| | Formulation Number | | | |
|---|---|---|---|---|
| | R-460 Control | R-462 | R-505(1) Control PBW | R-506(1) |
| Sealant Properties | | | | |
| Melt Viscosity, @(Pa-sec 350° F.) | 2.280 | 3.140 | 4.000 | 15.400 |
| Slump °C. | 55 | 85 | 80 | 110 |
| SAFT °C. | 51 | 69 | 58 | 77 |
| Change in slump per absolute change in visc., °C./Pa-sec | — | 34.9 | — | 2.63 |
| Change in SAFT per absolute change in visc., °C./Pa-sec | — | 20.9 | — | 1.67 |

TABLE VII

Sealant Formulations and Properties for Invention Polymer D

| | Formulation Number | |
|---|---|---|
| | R-505(2) Control | R-506(2) |
| Invention Polymer D | 100.0 | 100.0 |
| Endex 155 | 13 | — |
| Arizona XR-6503 | — | 26 |
| Regalrez 1018 | 270 | 257 |
| Antioxidant: Irganox 1010 | 1.0 | 1.0 |
| UV Stabilizer: Tinuvin 770 | 1.0 | 1.0 |
| UV Stabilizer: Tinuvin P | 1.5 | 1.5 |
| Total PBW | 386.5 | 386.5 |
| Weight percent PPE | — | 3.36 |
| Sealant Properties | | |
| Melt Viscosity, (Pa-sec @ 177° C.) | 3.70 | 8.55 |
| Slump °C. | 80 | 110 |
| SAFT °C. | 58 | 77 |
| Absolute change in melt viscosity | — | 4.85 |
| Fractional increase in melt viscosity | — | 1.31 |

Table VIII shows a comparison between the sealant property change data for formulation R-506(2) (Invention Polymer D) above with the equivalent data from formulations R-462 (Table VI—Invention Polymer B), R-267 (Table IB—Invention Polymer A), formulation R-264 (Table IIB—Conventional Polymer 1), and R-188 (Table IIIB—Conventional Polymer 2). All are compared against the properties for the respective control formulation. It can be clearly seen that the lower molecular weight polymers within the scope of this invention perform better than the higher molecular weight polymer within the scope of this invention. Invention Polymer D is clearly superior to Conventional Polymer 1 in all measurements and shows significant advantages over Conventional Polymer 2 in change in slump and SAFT per weight percent of PPE used in the formulation.

TABLE VIII

Comparison of Sealant Properties

| Formulation | R-506(2) | R-462 | R-267 | R-264 | R-188 |
|---|---|---|---|---|---|
| Change in slump vs respective control, °C. | +30 | +30 | +30 | +20 | +40 |
| Change in slump per absolute change in visc., °C./Pa-sec | 6.19 | 35 | 83 | 3.34 | 15 |
| Change in slump per fractional increase in visc., °C. | 23 | 79 | 80 | 3.6 | 32 |
| Change in slump per weight percent PPE, °C. | 8.93 | 8.93 | 8.93 | 5.95 | 5.38 |
| Change in SAFT vs. respective control formulation, °C. | +19 | +18 | +22 | +14 | +27.8 |
| Change in SAFT per absolute change in visc., °C./Pa-sec | 3.92 | 21 | 61 | 2.34 | 10.7 |
| Change in SAFT per fractional increase in visc., °C. | 14.5 | 47 | 59 | 2.2 | 22 |
| Change in SAFT per weight percent PPE, °C. | 5.65 | 5.36 | 6.64 | 4.2 | 3.74 |

I claim:

1. A high service temperature, low viscosity thermoplastic elastomer composition which comprises:

(a) from 2.0 to 30.0% by weight of a polyphenylene ether resin having an intrinsic viscosity of 0.07 to 0.25 deciliters per gram, and (b) from 70.0 to 98.0% by weight of an asymmetric radial elastomeric vinyl aromatic hydrocarbon/conjugated diene block copolymer having one of the following formulae:

$$(A-HD)_x-Y-(UD)_z \tag{I}$$

or $$(UD-A-HD)_x-Y \tag{II}$$

or $$(UD-A-HD)_x-Y-(UD)_z \tag{III}$$

wherein A is a vinyl aromatic hydrocarbon block having a weight average molecular weight of from 4000 to 16,000, HD is a hydrogenated conjugated diene block having a weight average molecular weight of from 10,000 to 50,000, Y is a multifunctional coupling agent, UD is a partially hydrogenated conjugated diene block having a weight average molecular weight of from 1000 to 45,000, x is an integer from 2 to 30, z is an integer from 1 to 20, and x+z ranges from 3 to 31.

2. An adhesive or sealant composition comprising the composition of claim 1 and a tackifying resin.

3. The composition of claim 1 wherein the copolymer has two styrene-hydrogenated butadiene arms and two partially hydrogenated polyisoprene arms.

4. An adhesive or sealant composition comprising the composition of claim 3 and a tackifying resin.

5. The composition of claim 1 wherein the overall weight average molecular weight of the copolymer is 115,000 or less and the vinyl aromatic hydrocarbon block molecular weight ranges from 4000 to 10,000.

6. An adhesive or sealant composition comprising the composition of claim 5 and a tackifying resin.

* * * * *